United States Patent
Bell

[15] 3,677,168
[45] July 18, 1972

[54] PIE AND CAKE SAVER

[72] Inventor: R. Gordon Bell, 6815 N. 58th Place, Scottsdale, Ariz. 85253

[22] Filed: June 4, 1971

[21] Appl. No.: 150,032

[52] U.S. Cl.................................................99/234 S, 294/1 R
[51] Int. Cl. ...........................................................A47j 43/00
[58] Field of Search.....................99/234; 294/1, 131; 220/22

[56] References Cited

UNITED STATES PATENTS

| | | | |
|---|---|---|---|
| 168,437 | 10/1875 | Wells | 99/234 S UX |
| 752,006 | 2/1904 | Smith | 99/234 S UX |
| 1,290,186 | 1/1919 | Held | 99/234 S UX |
| 1,613,223 | 1/1927 | Davis | 220/22 X |
| 1,647,186 | 11/1927 | Miles et al. | 220/22 |
| 1,909,983 | 5/1933 | Powell | 220/22 |
| 2,546,800 | 3/1951 | Thiac et al. | 294/1 R X |
| 2,573,577 | 10/1951 | Koponen | 99/234 S UX |
| 2,658,643 | 11/1953 | Miller et al. | 220/22 |

Primary Examiner—Edward L. Roberts
Assistant Examiner—Arthur O. Henderson
Attorney—Warren F. B. Lindsley

[57] ABSTRACT

A culinary device for shielding the cut surfaces of cakes, pies and the like comprising one continuous piece forming two flat plates pivotally attached by an integrated hinge structure.

5 Claims, 8 Drawing Figures

Patented July 18, 1972  3,677,168

INVENTOR.
R. GORDON BELL
BY Warren F. B. Lindsley
ATTORNEY.

3,677,168

PIE AND CAKE SAVER

BACKGROUND OF THE INVENTION

This invention relates to culinary devices of the type designed to protect the exposed edges of freshly cut food products such as pies, cakes and the like, and more particularly to a culinary device employing a smooth uninterrupted hinged structure formed integral and continuous with a pair of shielding plates to form a utensil void of pockets or crevices which would hold food particles.

DESCRIPTION OF THE PRIOR ART

Heretofore, cheese, pie and cake protectors have been provided for protecting cut or exposed surfaces of these food products. These protectors employed hinge structures for their flat food protecting plates which were not only complicated to make but formed food pockets which were hard to clean and keep sanitary. Accordingly, a need exists for a relatively inexpensive hinged utensil which will hold one of a plurality of given positions when placed against exposed edges of a food product.

Further, the improved food protector must provide a hinge structure formed integral and continuous with its food protecting flat surface to form an uninterrupted surface exposed to the food product.

SUMMARY OF THE INVENTION

It is, therefore, one object of this invention to provide an improved protector for application to and covering for exposed cut surfaces of cakes, cheeses, pies and the like to prevent said surface from drying out or becoming stale.

Another object of this invention is to provide an improved shield for the cut surfaces of food products such as cakes, pies, cheese and the like employing hinged plates wherein the hinge and plates are formed of one continuous unbroken configuration.

A further object of this invention is to provide a protector for cakes, pies, cheese and the like which is readily positioned to fit against two exposed surfaces of the food item regardless of the angle of disposition of these surfaces.

A still further object of this invention is to provide a continuous unbroken surface food protector having two hingedly mounted plates which fold into a relatively compact unit.

A still further object of this invention is to provide a cake, pie and cheese protector which is attractive in appearance and may be readily fabricated.

Further objects and advantages of the invention will become apparent as the following description proceeds and the features of novelty which characterize this invention will be pointed out with particularity in the claims annexed to and forming part of this specification.

DESCRIPTION OF THE PREFERRED EMBODIMENT

Figure 1:
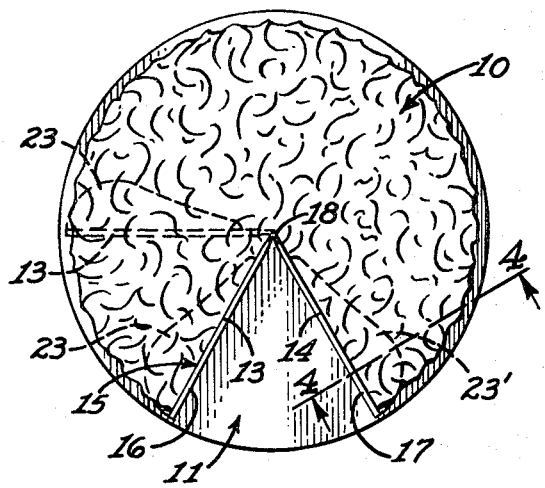
FIG. 1 is a top plan view of a cake and its plate showing the protector of my invention in position.

Referring more particularly to the drawing by characters of reference, FIGS. 1–4 illustrate, for example, a food product such as a round cake 10 supported on a round plate 11. Cake 10 is cut radially at 13 and 14 in the usual way for serving wedge-shaped pieces of the cake.

Figure 2:
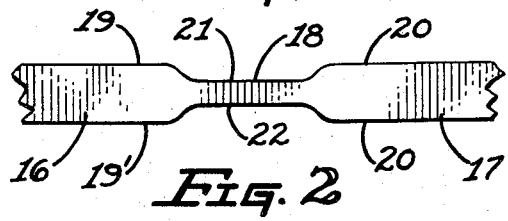
FIG. 2 is an enlarged partial view of a top view of the hinge member and plates of the structure shown in FIG. 1 in extended position.
Figure 3:
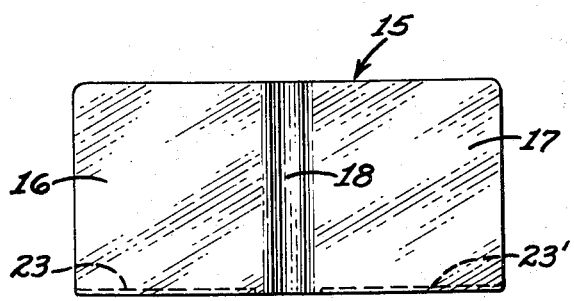
FIG. 3 is a front view of the protector shown in FIG. 1 with the plates in horizontal alignment.

The holder shield or protector 15 for protecting the exposed edges of the cake comprises a pair of plates 16 and 17 joined together at their juxtapositioned ends by means of a hinge 18 which comprises an integral part of plates 16 and 17. As shown in FIGS. 2 and 3 the hinge is formed as a necked down portion of the holder forming a continuous and integral part of plates 16 and 17. Although the hinge is shown as being of reduced thickness from the thickness of plates 16 and 17 and extending an equal distance inwardly from the common surfaces 19, and 19', and 20, 20' of plates 16 and 17 the hinge could be formed to extend in a plane common to either surfaces 19 and 20 or 19' and 20' of the plates.

In accordance with the invention claimed the hinge forms on its sides 21 and 22 a continuous smooth unbroken surface with surfaces 19, 20 and 19', 20', respectively, of plates 16 and 17.

Plates 16 and 17 are proportioned and arranged to extend radially along the exposed edges of the cake with hinge 18 disposed at the apex of the wedge-shaped opening. The apex ordinarily is located at the center of the cake with the hinge extending the full height of the plates 16 and 17.

Figure 4:
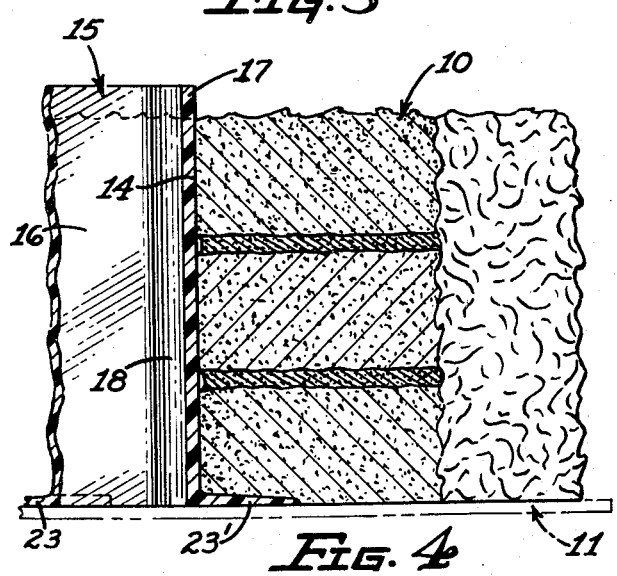
FIG. 4 is an enlarged cross-sectional view of FIG. 1 taken along the line 4 — 4.

Plates 16 and 17 are provided with flanges 23 and 23', respectively, arranged to extend horizontally in a common direction and plane from plates 16 and 17 along plate 11. These flanges are intended to be slipped beneath the cake bearing on the plate 11 to support plates 16 and 17 in a substantially vertical position. FIGS. 1 and 4 illustrate the general shape of these flanges.

The top edge of the protector and its outer vertical edges preferably conform in contour with the top and outside contour of the cake. When the cake is rectangular a protector having substantially the same cross-sectional shape as the cake may be employed.

FIGS. 1 and 4 illustrate the protector positioned against the cut surfaces of the cake with the inwardly directed flanges 23 and 23' positioned beneath the cake and bearing on the top surfaces of plate 11. Flanges 23 and 23' support the flat surfaces of plates 16 and 17 in a vertical position against the cut surfaces of the cake whereby said surfaces are effectively sealed against drying out.

Figure 5:
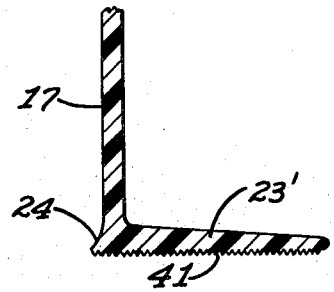
FIG. 5 is an enlarged cross sectional view showing a modification of the protector.

FIG. 5 illustrates a modification of the protector shown in FIGS. 1–4 wherein the surface of plates 16 and 17 opposite to the surfaces from which flanges 23 and 23' extend are provided with a heel or lip 24 to further support the plates in a vertical position.

Figure 6:
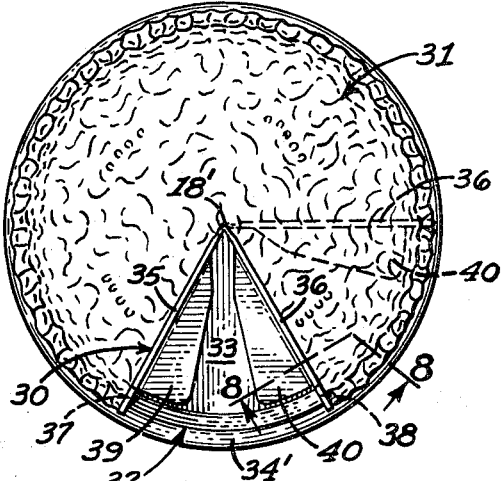
FIG. 6 is a top plan view of a pie and its pie pan showing a modification of the protector shown in FIGS. 1–5.
Figure 7:
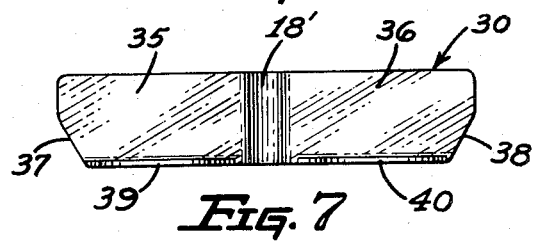
FIG. 7 is a front view of the pie protector shown in FIG. 6 with the plates in horizontal alignment.
Figure 8:
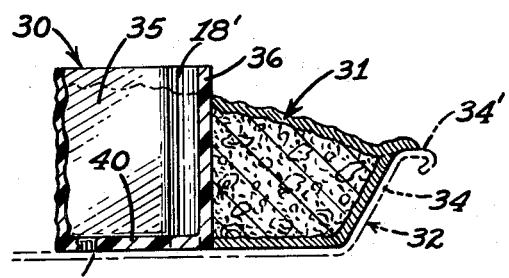
FIG. 8 is an enlarged cross sectional view of FIG. 6 taken along the line 8 — 8.

FIGS. 6–8 illustrate a further modification of the structures shown in FIGS. 1–5 wherein a holder, shield or protector 30 is provided for use in protecting food products such as pies from which portions are cut and served in wedge-shaped pieces. The pie 31 shown in FIGS. 6 and 8 is contained in the conventional pie tin or baking dish 32 comprising a flat circular bottom 33 bounded by a wall 34 which diverges upwardly terminating in a flat rim 34'.

The pie protector 30 comprises a pair of elongated plates 35 and 36 joined at a common end by a hinge 18' identical in configuration but smaller in height to hinge 18 shown in FIGS. 1–4. Plates 35 and 36 are proportioned and arranged to extend radially along the exposed edges of the cut pie with hinge 18' disposed at the apex of the wedge-shaped opening. The ends of each of plates 35 and 36 opposite hinge 18' are formed with edges 37 and 38, respectively, which slope upwardly at an angle corresponding with the slope of the walls 34. Thus, as shown in FIGS. 6 and 8, a seal is provided between the edge of the plates and the pie dish to prevent passage of the pie filling therebetween.

In order to prevent radial displacement of plates 35 and 36 and to insure maintenance of the edges 37 and 38 in contact with the sloping wall of the pie dish, the bottom edges of plates 35 and 36 are provided with flanges 39 and 40, respectively, projecting laterally outwardly from the sides of the plates opposite to those against which the edges of the pie come in contact. Although it should be noted that the flanges 39 and 40 may extend in the opposite direction under the pie crust.

In all of the embodiments disclosed the hinge comprises a continuous part of the plates necked down sufficiently from the thickness to form an easily flexed plate interconnecting member which may readily position the plates in any angular or plane position.

Since hinges 18 and 18' form a smooth pocketless structure food products can be easily wiped or washed away thereby providing hinge features without the usual food cavities.

In order to further hinder the movement of the plates of the protectors away from given positions against the cake or pie shown, the bottom edges of the flanges of any of the disclosed protectors may be ridged or serrated as shown in FIG. 5. These grooves 41 provide a rough surface aiding in gripping the plate or tim within which the food product is contained. If desired, in place of serrations the bottom of the flanges may be treated with a rubber-like material forming a tacky surface for gripping the plate or pie tin.

Although but a few embodiments of the invention have been shown and claimed it will be apparent to those skilled in the art that various changes and modifications may be made therein without departing from the spirit of the invention or from the scope of the appended claims.

I claim:

1. A plastic device for protecting the exposed edges of circular food items after removal of a wedge cut portion therefrom, said device comprising:
   a pair of plates,
   hinge means for joining together juxtapositioned ends of said plates,
   said hinge means comprising a necked down integral part of said plates having a thickness substantially less than the thickness of said plates,
   said hinge means readily bending for positioning said plates in any one of a plurality of angular positions, and
   a pair of flanges one projecting transversely from the lower ends of each of said plates for supporting said plates in a substantially vertical position.

2. The device set forth in claim 1 wherein said hinge means extends substantially along the full length of the ends of said plates and forms a smooth arcuate surface connection with the surfaces of said plates.

3. The device set forth in claim 2 wherein the bottom of said flanges are provided with means for increasing the adhesion between said flanges and the surface upon which the food item is placed.

4. The device set forth in claim 2 wherein the bottom surfaces of said flanges are roughened to increase the friction between the bottom of the flanges and the surface supporting the food item.

5. The device set forth in claim 2 wherein said plates, hinge means and flanges are one continuous molded member all formed of the same plastic material.

* * * * *